Jan. 19, 1943.  R. A. WILLIAMS ET AL  2,308,579
METHOD AND MEANS FOR MAKING LOCK WASHERS
Filed March 9, 1942  7 Sheets-Sheet 2
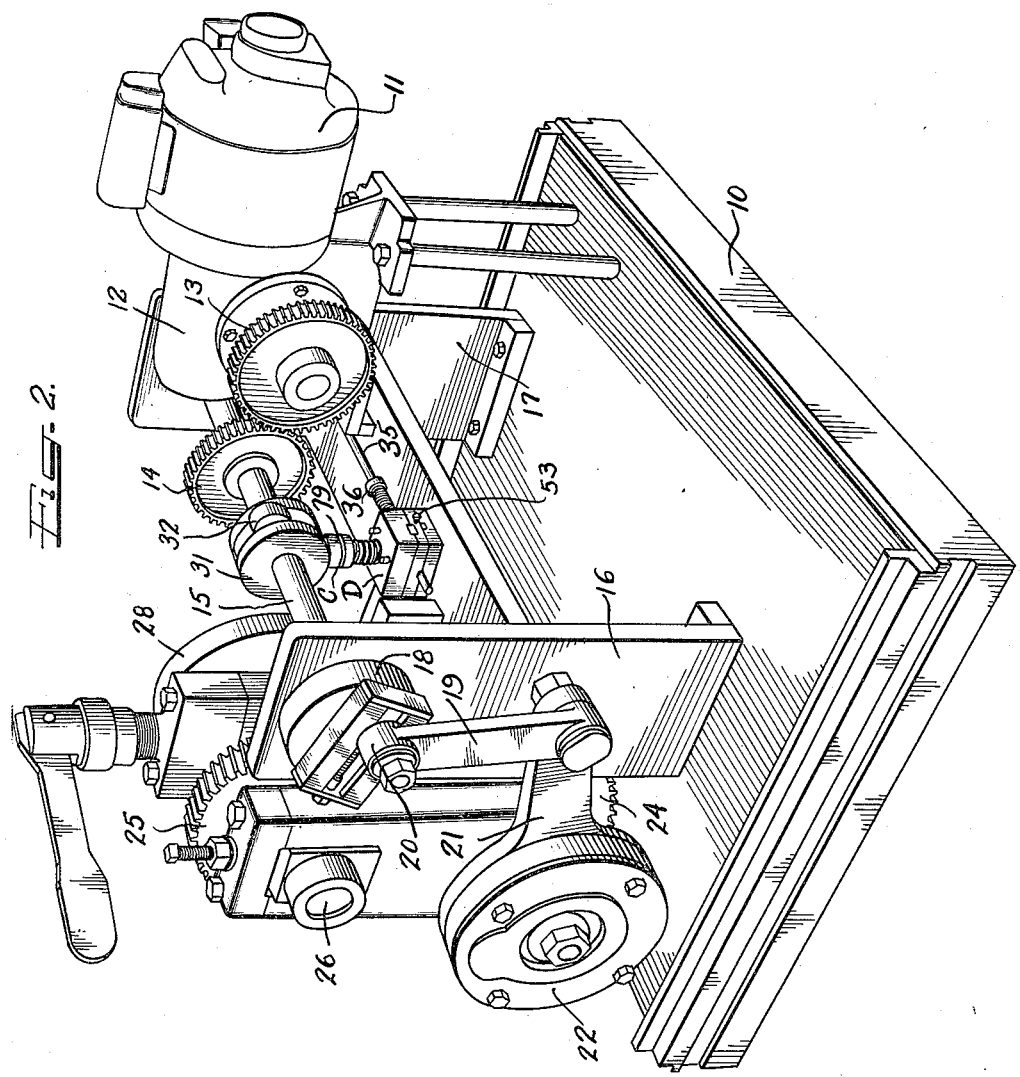
Inventors
ROBERT A. WILLIAMS.
ROBERT A. WILLIAMS JR.

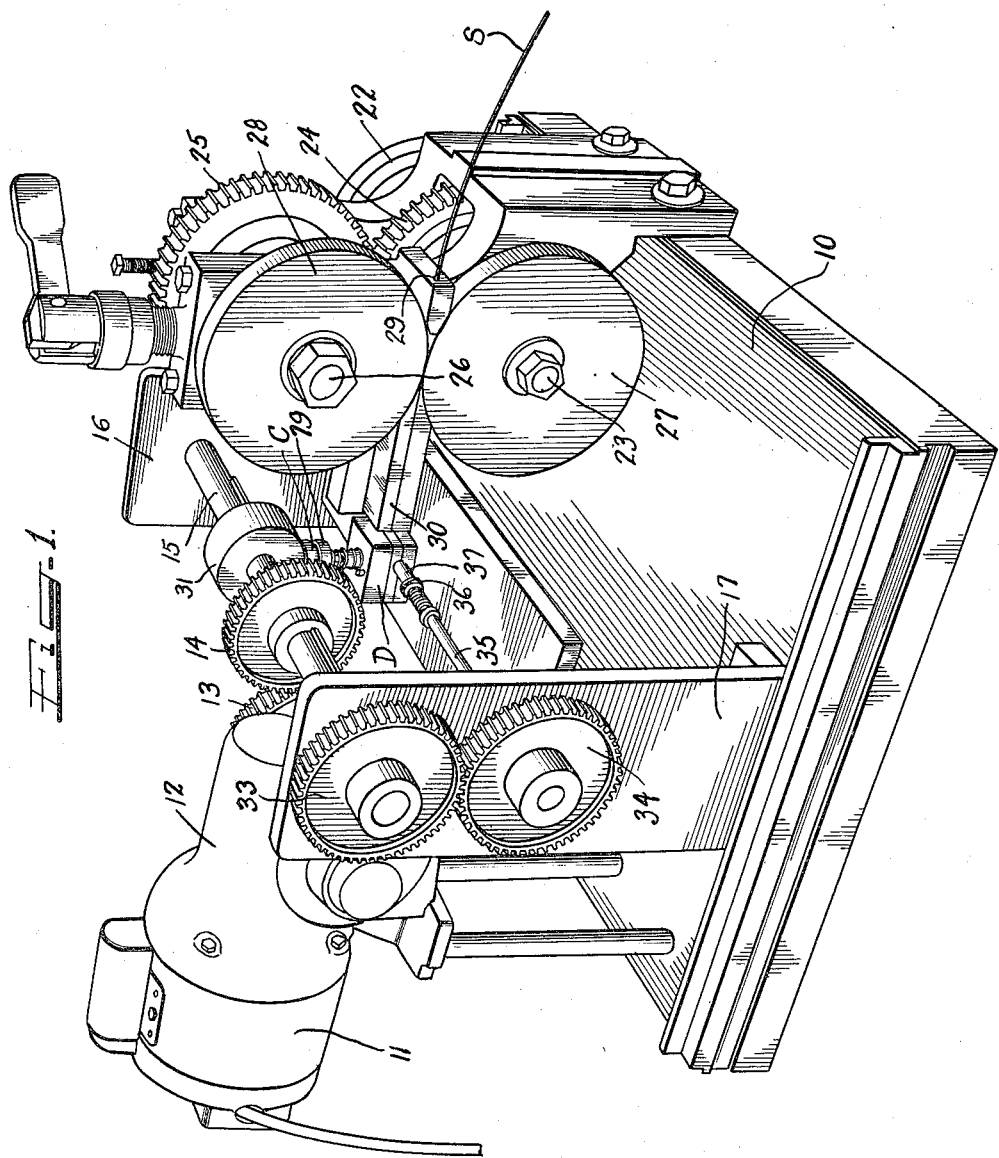

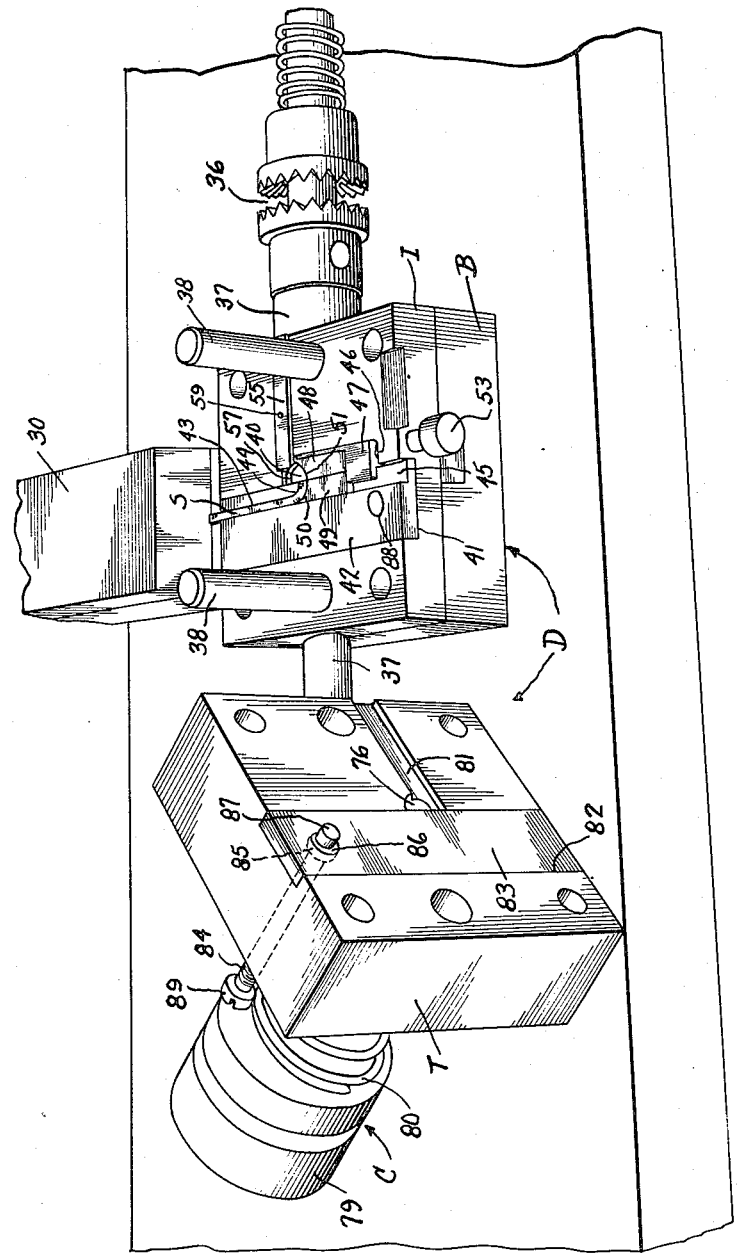

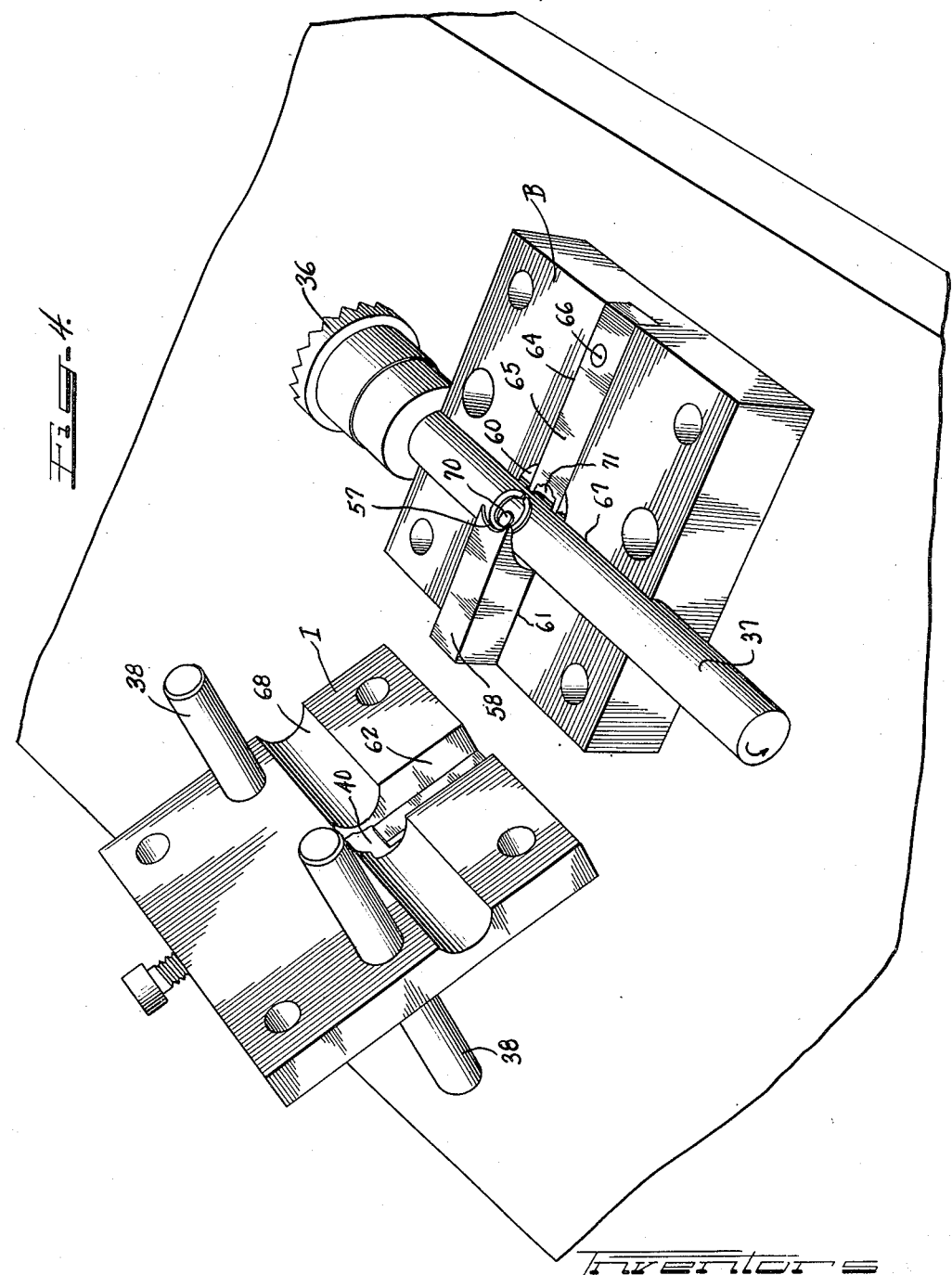

Jan. 19, 1943.    R. A. WILLIAMS ET AL    2,308,579
METHOD AND MEANS FOR MAKING LOCK WASHERS
Filed March 9, 1942    7 Sheets-Sheet 5
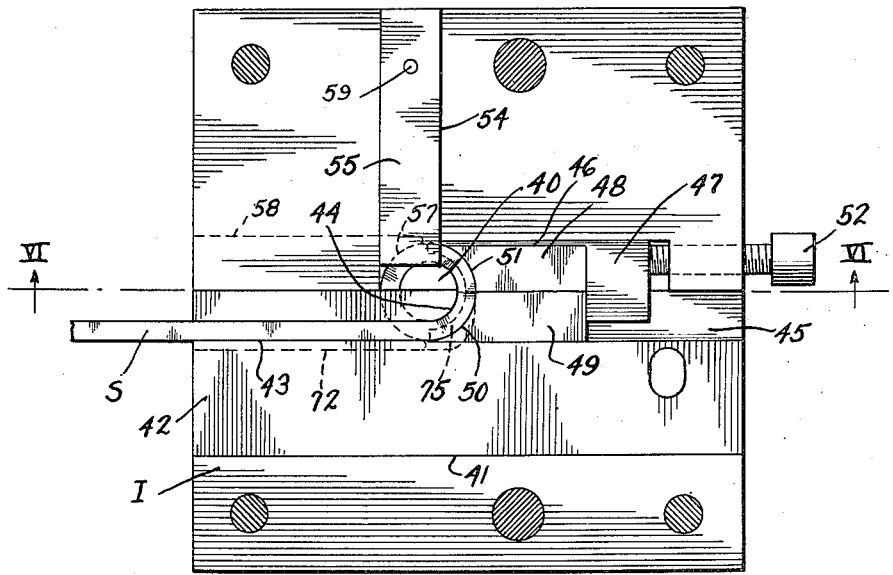
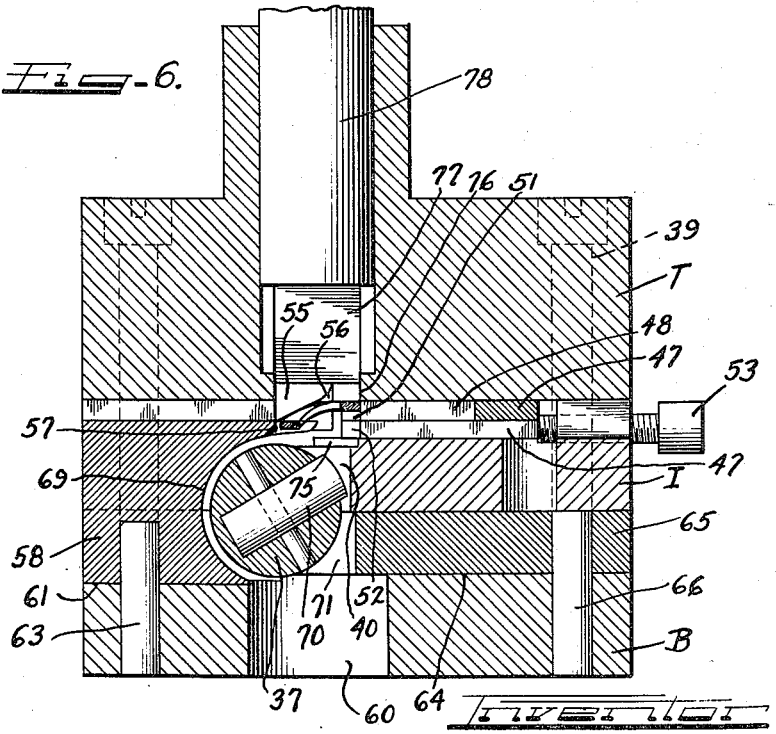
Robert A. Williams.
Robert A. Williams, Jr.

Jan. 19, 1943. R. A. WILLIAMS ET AL 2,308,579
METHOD AND MEANS FOR MAKING LOCK WASHERS
Filed March 9, 1942 7 Sheets-Sheet 6
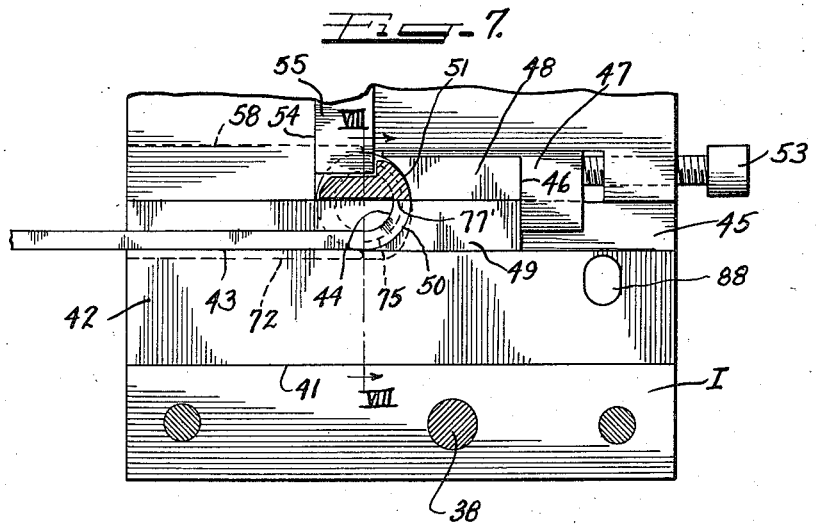
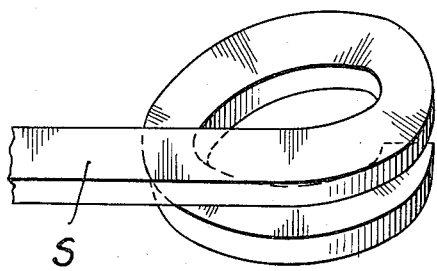
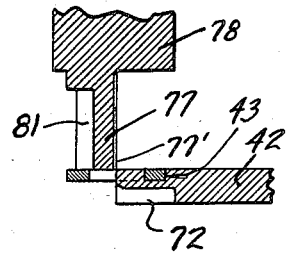
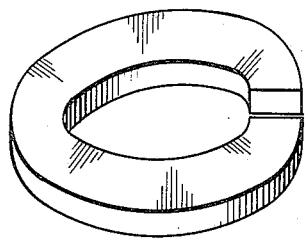
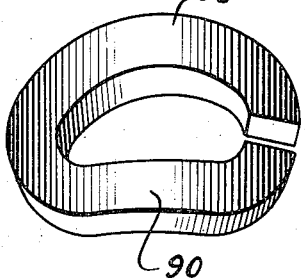
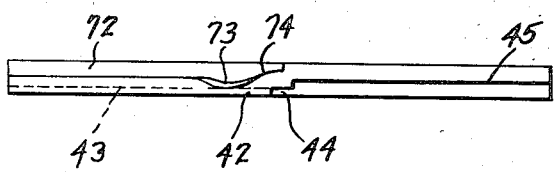
Inventors
ROBERT A. WILLIAMS.
ROBERT A. WILLIAMS, JR.

Patented Jan. 19, 1943

2,308,579

UNITED STATES PATENT OFFICE 2,308,579

METHOD AND MEANS FOR MAKING LOCK WASHERS

Robert A. Williams and Robert A. Williams, Jr., Chicago, Ill., assignors to Eaton Manufacturing Company, Detroit, Mich., a corporation of Ohio Application March 9, 1942, Serial No. 433,890

12 Claims. (Cl. 10—73)

This invention relates to the manufacture of spring lock washers, and, in general, the object is to provide an improved method and means for economically and efficiently manufacturing washers of the helical type, or washers of the type which have three point contact on one side and two point contact on the opposite side such as washers disclosed, for example, in McGrew Patent No. 2,235,233, dated March 18, 1941.

More in detail, an important object is to progressively form the washers from continuous stock, such as steel wire or ribbon in annealed condition, intermittently advanced into engagement with forming members and surfaces through a helical path to the extent of a single turn or coil of a helix, and after each such formation severing the formed coil from the stock to produce the washer.

A further important object is to provide means and procedure in which, after severance of a washer forming coil from the stock, the end of the stock will retain thereon a quarter turn for facilitating progression of the stock end, under feed pressure, into engagement with the various forming and guiding surfaces to complete the helical coil to be severed from the stock to produce the washer.

A further important object is the provision of additional procedure and means for carrying the helical coils, after severance from the stock, between forming surfaces for taking the helical shape out of the coils and arching the coil legs to produce washers which will have three point contact on one side and two point contact on the other.

Another important object is to provide simple and improved means cooperable in timed relation to effect intermittent pressure in-feed of the stock for forming of the helical coils, then to sever the coils from the stock, and then to carry the coils into engagement with the forming surfaces for final formation of the washers.

The various features of the invention are embodied in the structure shown on the drawings, in which:

Figure 1 is a perspective view of an assembled machine showing the various elements which cooperate to form the washers;

Figure 2 is a perspective view from the opposite side of the machine;

Figure 3 is a perspective view of the forming die assembly with the upper die member separated from the intermediate and lower die members;

Figure 4 is a perspective view of the intermediate and lower die members separated from each other;

Figure 5 is an enlarged plan view of the assembled intermediate and lower die members showing the formation of an embryo washer before cutting thereof from the stock;

Figure 6 is a section of the entire die assembly taken substantially on plane VI—VI of Figure 5;

Figure 7 is a view similar to Figure 5 showing the operation of the cutter to sever the embryo washer from the stock;

Figure 8 is a section on plane VIII—VIII of Figure 7;

Figure 13 is an inside edge view of the stock guiding plate;

Figure 14 is a perspective view of the end portion of the stock with an embryo washer formed but not severed therefrom;

Figure 15 is a perspective view of the embryo washer after severing from the stock; and Figure 16 is a perspective view of a finished washer.

Figure 9:
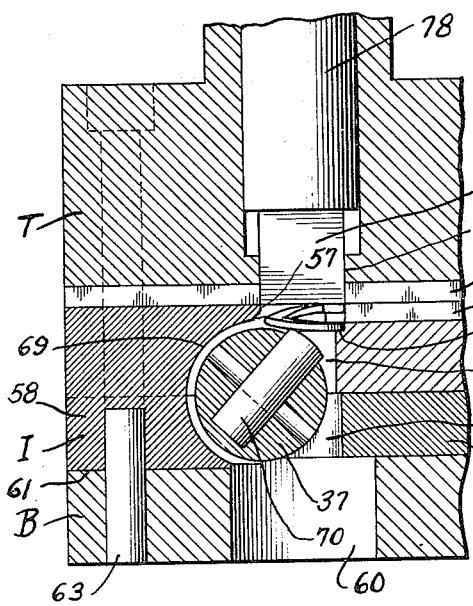
Figure 9 is a view similar to Figure 6 showing the cutter in operation and the severed embryo link about to be engaged by transfer means for travel of the embryo washer between surfaces for the transverse arching thereof.
Figure 11:
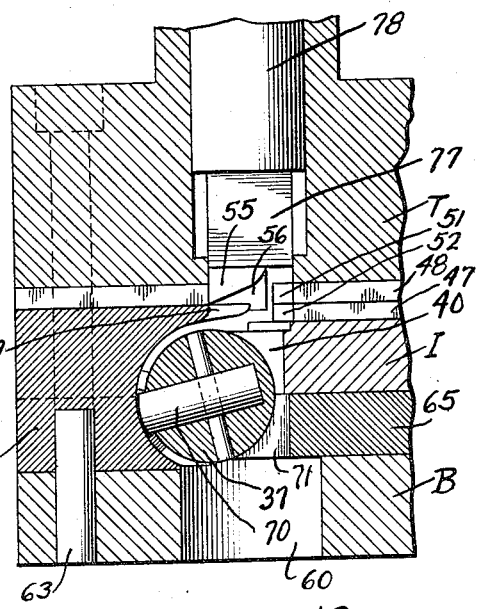
Figure 11 is a section similar to Figure 10 showing the washer being carried by the transfer means between forming surfaces for the arching of the washer.

Referring to Figures 1 and 2, the machine shown comprises a supporting base 10, on which is supported a driving motor 11 connected through reduction gearing within a housing 12 with a gear 13 which meshes with a gear 14 on a shaft 15 journalled in bearing pedestals 16 and 17, the shaft outside of the pedestal 16 carrying a crank head 18 with which a crank arm 19 has adjustable connection 20. The crank arm 19 connects with the arm 21 extending from one member of an intermittent clutch structure 22 whose other member is secured to a feed shaft 23. At the outer end of this feed shaft is a gear 24 meshing with a gear 25 on the upper feed shaft 26, the feed shafts at their inner ends mounting respectively the feed disks or wheels 27 and 28 between and by which is fed the stock S from which the washers are to be formed. The fed stock is guided through a passageway 29 in the guide block 30 which terminates at the entrance end of the die assembly D in which the washers are to be formed.

The shaft 15 drives a cylindrical member 31 on which a cam roller 32 is mounted for engagement with the cutter structure C extending into the die assembly D. On the shaft 15, outside of the bearing pedestal 17, is a gear 33 meshing with the gear 34 on a shaft 35 which is connected by a coupling 36 with the shaft 37 which extends into the die assembly D for controlling the operation of the washer transfer and arching mechanism.

The timing of the operation is such that in the intervals between feeding of stock into the die structure D and forming of embryo washers, the cutter mechanism C becomes effective to sever the embryo washers from the stock, and the transfer mechanism becomes operative to carry the embryo washers through a forming passageway for transverse deflection or arching of the washers, and ejection of the finished washers from the machine.

Referring to Figures 3 to 6, the die assembly D comprises the upper die block T, the intermediate die block I, and the bottom block B, these blocks being held in operative alignment by dowel pins 38 and held detachably secured together as by screws 39. The intermediate member I has, near its middle point, a substantially cylindrical passageway 40 therethrough, and at one side of this opening there is a channel 41 in the block in which is the guide plate 42, this plate overlapping one-half of the passageway 40. At its rear or inlet end (Figure 3), the plate has the longitudinally extending channel 43 of a cross section to snugly receive the stock S, from which the washers are to be formed, the stock and the channel being, as shown, of rectangular cross section. At its forward end, the channel 43 takes a quarter turn 44 toward the right to terminate at the right edge of the plate, this turn being to the radius corresponding to the inner radius of the washers to be formed. Forwardly of the channel 43, the plate is of reduced depth to provide a seat 45, and adjacent to this seat, the block I is cut down to form the seat 46. Mounted in the seat 46 is a carrier 47 which is recessed to form a seat for a die or forming plate 48 of tempered metal, and a companion die plate 49 is supported on the seat 45 in the plate 42. At their inner ends, the plates 48 and 49 are cut away to provide arcuate guide surfaces each of 90° extent and to a radius which is the inner radius of the washers to be formed, the arcuate surface 50 on the plate 49 forming the front wall for the quarter turn end 44 of the channel 43 and the arcuate surface 51 on the plate 48 forming a continuation of the surface 50, so that together the plates will present a continuous guiding surface of substantially semi-circular extent and concentric with the passageway 40 through the block I. As best shown on Figure 6, the inner end of the carrier 47 presents the arcuate surface 52 which coincides with the surface 51 on the plate 48. An adjusting screw 53 may be provided on the block I for abutting the forward end of the carrier 47 for setting thereof and of the plates 48 and 49 relative to the feed channel 43.

The intermediate block I has a channel 54 therein at right angles to the channel 41, and seated in this channel is a guide bar 55 which terminates adjacent to the rear end of the carriage 47, the end of the bar being shaped to provide a guide surface 56 for receiving the end of the stock after passage along the surfaces 50 and 51 of the forming plates 48 and 49 and to direct the stock diagonally downwardly for engagement with the concave guiding edge 57 on a guide member 58 supported in the bottom die block B. The guide bar 55 is held against longitudinal displacement as by a pin 59.

The bottom member B has the passageway 60 therethrough aligning with the passageway 40 in the intermediate block I. The guiding and forming member 58 is seated in the channel 61 for reception of its upper portion in the channel 62 in the under side of the intermediate block I, the member 58 being held against displacement by a dowel pin 63 (Figure 6). As shown on Figures 4, 5, and 6, the guiding surface 57 on the member 58 is of substantially semi-circular extent and is opposed to the semi-circular guide surface formed by the carrier 47 and the guide plates 48 and 49.

In the bottom die block B is another channel 64 terminating at the block passageway 60 opposite the guiding and forming member 58, and seated in the channel 64 is a stripper bar 65, the bar being held against longitudinal displacement as by a dowel pin 66. Extending across the bottom die block B at right angles to the channels 61 and 64 is a bearing channel 67 for registering with the bearing channel 68 in the under side of the intermediate block I to journal the shaft 37 which is driven through the coupling 36, the shaft extending across the passageways 40 and 60 in the blocks I and B. As best shown on Figure 6, the axis of the shaft is below the arcuate guiding edge 57 on the guide member 58, and this guide member is cut away to present a cylindrical surface 69 to the shaft, parallel with the shaft but spaced therefrom a distance equal to substantially the thickness of the washers. The shaft has a pin 70 seated diametrally therein and projecting a distance beyond the shaft for engaging in embryo washers, after severance from the stock, and drawing these washers down between the shaft and the forming surface 69 for transverse deflection or arching of the washers. The stripper bar 65 presents at its inner end an arcuate surface to the shaft 37 and has the slot 71 for passage of the projecting end of the pin 70, so that the points of the bar may engage the washers carried with the shaft to strip them from the shaft for discharge downwardly through the passageway 60.

As best shown on Figure 6, the guiding and forming member 58 projects at its upper end a distance into the channel 41 in which the guide plate 42 is located. As best shown on Figures 5 and 13, the plate 42 has the longitudinally extending recess 72 in its under side for receiving the projecting portion of the member 58, the edge of the plate 42, adjacent to the central portion of the concave guide surface 57 on the member 58, being rounded as indicated at 73 for receiving the end of the stock after engagement thereof with the surface 57 to guide the end of the stock to the bottom of the guide plate 42 above the recess 72 therein and then downwardly along the surface 74 for engagement of the stock end around the semi-circular ledge 75 formed on the intermediate member I around the passageway 40 to be opposed to the guide surface 57 but at a lower level, the semi-circular ledge being substantially in horizontal alignment with the top of the shaft 37. As will be explained more in detail later, the embryo washer, severed from the stock, will rest on this ledge and on the shaft.

The cutter mechanism for severing formed embryo washers from the stock is mounted on the upper die block T. This die block has the passageway 76 for the cutter 77 at the end of the shaft 78 which terminates in a head 79 engageable by the cam roller 32, a spring 80 between the head and the block tending to hold the head outwardly against the cylindrical cam block 31 and in the path of the cam roller 32. Referring to Figures 7 and 8, the cutter 77 is of semi-cylindrical cross section and is cut out as indicated at 81 to clear the guide bar 55. The cutter edge 77' cooperates with the edge of the guide plate 42 at the end of the channel bend 44 to shear the stock to sever therefrom the embryo washer which will then be in the form of a single turn or coil of a helix, as shown on Figure 9, the severed washer then resting on top of the semicircular ledge 75 and the shaft 37 in position to be engaged by the transfer pin 70 for travel between the shaft and the forming member 58 for transverse arching.

The upper die block T has the channel 81 in its under side for receiving the upper portion of the guide bar 55 when the die blocks are assembled. A channel 82 extends across the under side of the die block T for seating a plate 83 for engaging against the top of the guide plate 42 when the die blocks are assembled so as to form the upper wall for the stock feed in-channel 43 in the plate 42 and to hold the carrier 47 and the guiding plates 48 and 49 in position. The inner longitudinal edge of the plate 83 coincides with the inner edge of the plate 42 and forms a guide for the cutter 77. Extending through the die block T is a cylindrical bar 84 which at its inner end has a cylindrical head 85 integral therewith for engaging in the opening 86 in the plate 83, and from the head extends a pin 87 eccentric therewith and which projects into an oblong opening in the guide plate 42, so that upon turning of the bar 84 the plate may be adjusted. The bar 84 may have frictional engagement in the block T or may be threaded and provided with an outer slotted head 89, so that the bar may be readily turned as by a screwdriver.

The stock S, such as steel, is annealed so as to be devoid of any material elasticity and to more readily follow the guiding and forming surfaces, the finished washers being then tempered. As best shown on Figure 3, after each feed-in of stock and severing therefrom of an embryo washer, the end of the stock is in the form of a quarter turn which will become the first quarter turn of the next washer. With the turn at the end of the stock, it will more readily, under the feed-in pressure from the feeding mechanism, move against and around the various guiding surfaces for formation of the embryo washer. Referring to Figures 5 and 6, as the stock is fed in under pressure, the quarter turn end thereof will be forced around the arcuate ends of the plates 49 and 48, the end of the stock then encountering the beveled downwardly inclined surface 56 of the guiding bar 55 for engagement with the concave edge 57 of the forming member 58 and the guide surfaces 73 and 74 on plate 42 (Figure 13), the travel of the stock end being thus downwardly in helical direction until the stock end reaches the semicircular ledge 75 around which it is guided by the arcuate end 52 of the carrier 47 until the end surface of the stock comes into the plane of the inner edge of the guide plate 42, which is the cutting plane. Feed of the stock has now stopped, and the cam roller 32 travels against the head 79 of the cutter shaft 78 for downward movement of the cutter to cooperate with the edge of the guide plate 42 for shearing of the stock (as shown on Figures 7 and 9) and severance therefrom of the embryo washer shown on Figure 9. Figure 14 shows the end of the stock after its travel through the die structure and helical formation of the stock and before the cutter has operated.

Figure 10:
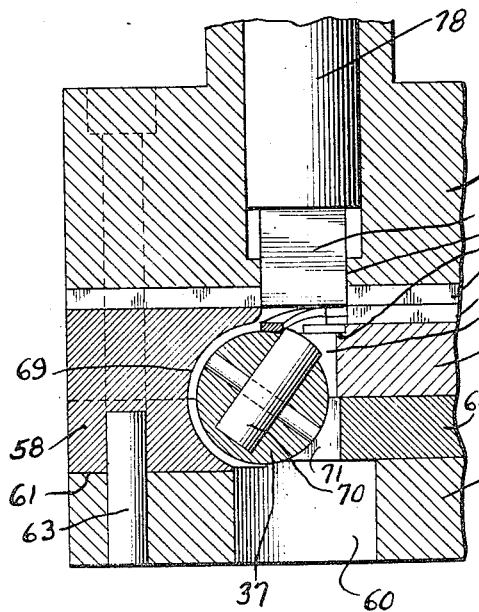
Figure 10 is a view similar to Figure 9 showing the engagement of the transfer means with the embryo washer.

The cutter, after cutting the stock, will hold the embryo washer against the ledge 75 and the top of the shaft 73 (Figure 9) until the pin 70 on the shaft has come into engagement with the washer (Figure 10) and started the washer into engagement with the forming surface 69 on the forming member 58, and as the cutter recedes, the washer is carried around with the shaft for compression between the shaft and the surface 69 for transverse bending of the washer for arching of the two legs thereof as indicated at 90 and 90' in Figure 16, the formation of the washer having thus been completed, Figure 15 showing the embryo washer before the arching formation thereof.

Figure 12:
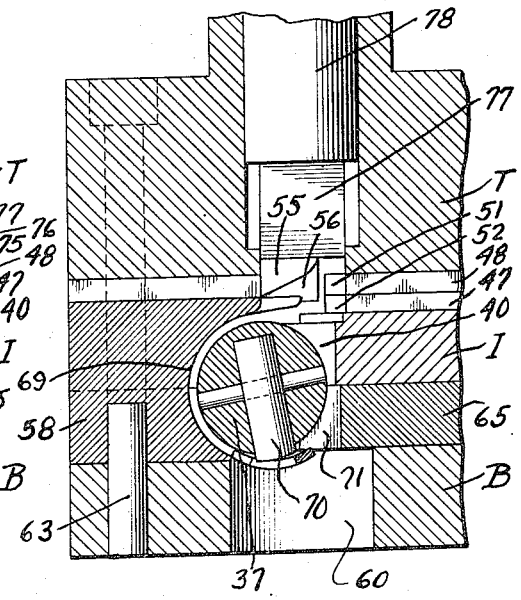
Figure 12 is a view similar to Figure 11 showing the completed washer about to be ejected from the machine.

As the finished washer leaves the forming surface 69, it engages the ends of the stripper bar 65 for removal from the shaft and delivery from the machine through the passageway 60, as shown on Figure 12. The finished washers are then tempered to the desired degree.

The travel of the embryo washer with the shaft against the forming surface 69 not only arches the washer legs but also removes the helical form so that on the final washer the end surfaces are directly opposed to each other, so that in service the washer will have a three point contact with one of the surfaces and a two point contact with the other of the surfaces between which the washer is clamped. However, it is evident that our improved machine could be used without the arching mechanism and to deliver washers of helical form such as shown on Figures 9 and 15.

We have shown a practical and efficient embodiment of the various features of our invention, but we do not desire to be limited to the exact construction, arrangement, or operation shown and described, as changes and modifications may be made without departing from the scope of the invention.

We claim:

1. The method of forming spring lock washers from a continuous bar of metal of the desired cross sectional shape which comprises forcing the bar under longitudinal pressure through a fixed path terminating in a quarter bend whose radius is that of the washers to be formed, forcing the stock in said bend under continued pressure on the bar for travel through a helical path defined by die surfaces until a complete helical turn is formed beyond said quarter turn, and then severing the coil from the stock at the end of said quarter turn.

2. The method of forming circular washers from a continuous bar of the desired cross sectional shape which comprises forcing the bar longitudinally through a fixed path terminating in a quarter bend whose radius is that of the finished washer, then under continuing pressure moving the end of the stock in said quarter bend through a circular path defined by die surfaces until a complete ring is formed, then cutting the ring from the stock at the end of the quarter turn.

3. The method of producing a spring lock washer which comprises forcing a rod of the desired cross sectional shape under longitudinal pressure through a helical path defined by die surfaces until a complete helical ring is formed, and then carrying the ring edgewise between opposed forming surfaces to form a substantially convex surface on one side of the ring and a substantially concave surface on the opposite side.

4. The method of producing spring lock washers from a continuous length of rod of the desired cross sectional shape, which comprises intermittently forcing the rod under longitudinal pressure through a circular path to form a ring, cutting each ring after formation thereof from the rod, and then carrying each ring out of said circular path and through a path between opposed forming surfaces to progressively form a substantially convex surface on one side of the ring and a substantially concave surface on the opposite side to produce the finished washer.

5. A die assembly for forming spring lock washers comprising means defining a guide path terminating in a helical portion, means for intermittently feeding a stock bar through said path under longitudinal pressure until the end portion of the stock forms a helical coil, cutting means operable after each coil formation to sever the coil from the stock bar, a mandrel and means thereon for receiving the severed coil, a forming surface adjacent to said mandrel, and means for rotating said mandrel to carry the coil edgewise between the mandrel and forming surface to form a substantially convex surface on one side of each coil and a concave surface on the opposite side.

6. A die assembly for producing spring lock washers from a continuous stock bar of the desired cross sectional shape, comprising means defining a fixed path terminating in a circular portion, means for intermittently feeding the stock bar through said passageway under longitudinal pressure for bending the end portion of the stock during each feed into a ring, cutting means operable to cut from the bar each ring after formation thereof, a cylindrical mandrel, means presenting a forming surface to said mandrel, means on said mandrel for engaging the severed ring, and means for rotating said mandrel for carrying said ring edgewise between the mandrel and said forming surface whereby to form a substantially convex surface on one side of the ring and a substantially concave surface on the opposite side to produce the finished washer.

7. A die assembly for forming spring lock washers from a continuous bar of metal of the desired cross sectional shape, comprising means defining a guide passageway terminating in a quarter turn whose radius is that of the finished washers, means defining a helical passageway forming a continuation of said quarter turn end of the first mentioned passageway, means for forcing the stock bar under longitudinal pressure through said passageways for successive forming of the end portions of the bar into embryo washers each in the form of a single helix coil, means for severing each coil from the stock bar at the end of said quarter turn passageway portion, a cylindrical mandrel for receiving the embryo washers and having a projection for engagement therewith, a forming member having a forming surface concentric with said mandrel, and means for rotating said mandrel to carry the embryo washers edgewise between the mandrel and said forming surface for bringing the ends of the embryo washers into opposition and for transversely arching said embryo washers to form the finished washers.

8. The method of progressively producing a spring lock washer which comprises forcing a rod of the desired cross sectional shape through a circular path defined by die surfaces to form a ring, then carrying said ring out of said path on a rotating mandrel and into engagement with a forming surface for transverse arching of the ring to form the finished washer.

9. The method of arching a substantially flat ring washer which consists in forcing the washer to travel edgewise through a path between a convex surface and an opposed concave forming surface to be thereby progressively bent to arched form.

10. The method of arching a substantially flat ring washer which consists in carrying the washer edgewise on a rotating mandrel into engagement with an opposed forming surface to progressively bend the washer to arched form.

11. The method of transforming a substantially flat ring washer into an arched washer which comprises causing the washer to travel edgewise around with a rotating mandrel to be forced by the mandrel against and along a stationary concave forming surface whereby the flat washer is progressively bent to arched form.

12. The method of transforming a substantially flat ring washer into an arched washer which comprises progressively bending the washer transversely against the cylindrical surface of a rotatable mandrel to form a substantially convex surface on one side thereof and a substantially concave surface on the other side.

ROBERT A. WILLIAMS.
ROBERT A. WILLIAMS, Jr.